(12) United States Patent
Huotelin et al.

(10) Patent No.: US 12,081,930 B2
(45) Date of Patent: Sep. 3, 2024

(54) VOICE-CONTROLLED HOUSEHOLD DEVICE

(71) Applicant: BSH Hausgeraete GmbH, Munich (DE)

(72) Inventors: Hannes Huotelin, Oulu (FI); Jan Ondrejcak, Kosice (SK); Frank Kohlrusch, Berlin (DE)

(73) Assignee: BSH Hausgeraete GmbH, Munich (DE)

( * ) Notice: Subject to any disclaimer, the term of this patent is extended or adjusted under 35 U.S.C. 154(b) by 363 days.

(21) Appl. No.: 17/551,240

(22) Filed: Dec. 15, 2021

(65) Prior Publication Data

US 2022/0191606 A1    Jun. 16, 2022

(30) Foreign Application Priority Data

Dec. 15, 2020   (EP) ..................................... 20214194

(51) Int. Cl.
*H04R 1/08*   (2006.01)
*G10L 15/22*  (2006.01)
*H04R 1/02*   (2006.01)
*H04R 1/44*   (2006.01)

(52) U.S. Cl.
CPC .............. *H04R 1/083* (2013.01); *G10L 15/22* (2013.01); *H04R 1/02* (2013.01); *H04R 1/44* (2013.01); *G10L 2015/223* (2013.01)

(58) Field of Classification Search
CPC ... H04R 1/04; H04R 1/12; H04R 1/08; H04R 1/083; H04R 1/086; H04R 1/02; H04R 1/023; G10L 15/22
See application file for complete search history.

(56) References Cited

FOREIGN PATENT DOCUMENTS

CN    210117554 U   *  2/2020

* cited by examiner

*Primary Examiner* — Kile O Blair
(74) *Attorney, Agent, or Firm* — Laurence A. Greenberg; Werner H. Stemer; Ralph E. Locher

(57) ABSTRACT

A household device contains a microphone that is adapted to sample sound from a surrounding of the household device and a processor for recognizing a voice command on the basis of the sampled sound. Further, there is a front face that extends in a vertical direction and a front cover that is affixed to the front face so that an acoustic path from the surrounding to the microphone contains a gap between the front face and the front cover.

10 Claims, 3 Drawing Sheets

VOICE-CONTROLLED HOUSEHOLD DEVICE

CROSS-REFERENCE TO RELATED APPLICATION

This application claims the priority, under 35 U.S.C. § 119, of European Patent Application EP 20214194.1, filed Dec. 15, 2020; the prior application is herewith incorporated by reference in its entirety.

FIELD AND BACKGROUND OF THE INVENTION

The present invention concerns a voice-controlled household device. More specifically the present invention concerns the placement of a microphone in a voice-controlled household device.

A household device is adapted to be voice controlled by a user. The device contains a microphone for sampling sound from an environment and processing means for recognizing a voice command on the basis of the sampled sound. Usually the microphone is placed in a top surface of the device, preferably to a side of the surface. However, in an environment where there may be a splash of water, a microphone in this position is prone to be negatively influenced by water. A waterproof microphone may be used but even a small amount of water may impair an acoustic path from the environment or the microphone so that the sampled sound signal may be weak. The sampled sound may also be distorted by the water so that some frequencies may be attenuated. In both cases voice recognition may be less than optimal.

SUMMARY OF THE INVENTION

It is an object of present invention to provide an improved voice controlled household device that can be operated in splash water conditions. The invention solves the given object through the subject-matter of the independent claims. Dependent claims outline preferred embodiments.

According to a first aspect of present invention a household device contains a microphone that is adapted to sample sound from a surrounding of the household device and processing means for recognizing a voice command on the basis of the sampled sound. Furthermore, the device contains a front face that extends in a vertical direction and a front cover that is affixed to the front face so that an acoustic path from the surrounding to the microphone contains a gap between the front face and the front cover.

The front face may be part of a chassis or body. This part may have a complex shape to allow mounting of elements like a manual control, a display or a receptacle for detergent. The front face does not necessarily extend over the complete front of the device.

The cover face may be mounted in parallel to the front face, leaving an air gap in between. No recess in the front cover may be required for permitting the passage of sound through the gap, which may result in an aesthetically more pleasing device. It may also leave more room for designing the cover. This may be especially important if the device can be equipped with one of a selection of different front covers. The front covers may be used to adapt the device's style to an environment, like a kitchen. Also, the device may be branded in different ways through different covers. The splash water may be kept away from the microphone. The water that enters the path may flow off easily so that clogging of the acoustic path may be prevented. Should the water be soiled, for instance with dirt or detergents, the vertical direction of the path may help preventing soiling to adhere to the path's walls. Incremental clogging or changing of the acoustic properties of the sound path may thus be prevented. The path may dry quickly so that fungal infestation may be prevented.

The acoustic path is preferred to extend in a vertical direction between the front face and the front cover. Therefore, a liquid like water may run through the path past the microphone, so that sound processing is not affected by the water. This makes the invention particularly suitable for a household device that uses processing water, like any type of cleaning machine, or a device that may be used in a wet environment like a kitchen or a bathroom of a household.

The acoustic path between the front face and the front cover is preferred to be limited in a lateral direction. A limit may be formed either on the front face or on the front cover and may come in the shape of extra material that forms a bulge or ledge to border the path. The limit may help channeling a sound wave from the device's exterior towards the microphone. The limit may also help leading water or another liquid away from the microphone.

The acoustic path between the front face and the front cover may get narrower in a descending direction. The section of the acoustic path that is built between the front face and the front cover may thus be shaped like a funnel. The section may also be described as having a form similar to the letter V when observed from the front of the device. A cross section of the path may decrease the further down the funnel it is measured. The microphone may be placed at a lower end of the path.

The acoustic path between the front face and the front cover may have essentially constant thickness. Thickness may be determined through a distance between the front face and the front cover. This may help mounting the front cover in a constant distance to the front face. Both the front cover and the front face may have a level surface and the surfaces may face each other. More complex shapes are also possible.

The acoustic path may comprise a horizontal section. This may help keep a liquid away from the microphone. A joint between the vertical and the horizontal section may be situated at a lower end of the vertical section. The horizontal section may practically not impair conductance of sound along the path. In an especially preferred embodiment, the acoustic path may extend through a recess in the front face and the recess may act as the horizontal section. In some embodiments the horizontal section may have a small inclination up to approximately 10°. The inclination may be chosen so that water is guided away from the microphone. The recess may come as a through-hole through the front face or an element having the front face. A cross section of the recess may be circular or have the shape of a slit. Other forms are also possible.

The acoustic path between the front face and the front cover may extend vertically lower than the recess. Should liquid run vertically between the front face and the front cover, it may not reach the microphone unless it accumulates sufficiently below the horizontal section.

The processing means may be adapted to control the household device in accordance with a recognized voice command. A spoken dialogue between a user and the household device may be possible. The spoken command may for instance start or stop a program or change an operational parameter.

The device may especially be adapted to operate in a splash water environment. Such an environment may be found in a household, especially when the device is adapted to be operated in a bathroom or a kitchen.

The device may perform garment treatment like washing or drying. The device may therefore comprise for instance a washing machine or a tumble dryer. The device may also comprise a personal hygiene item like an electric toothbrush or an oral douche. Other speech-controlled household devices may also make use of present invention.

Other features which are considered as characteristic for the invention are set forth in the appended claims.

Although the invention is illustrated and described herein as embodied in a voice-controlled household device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
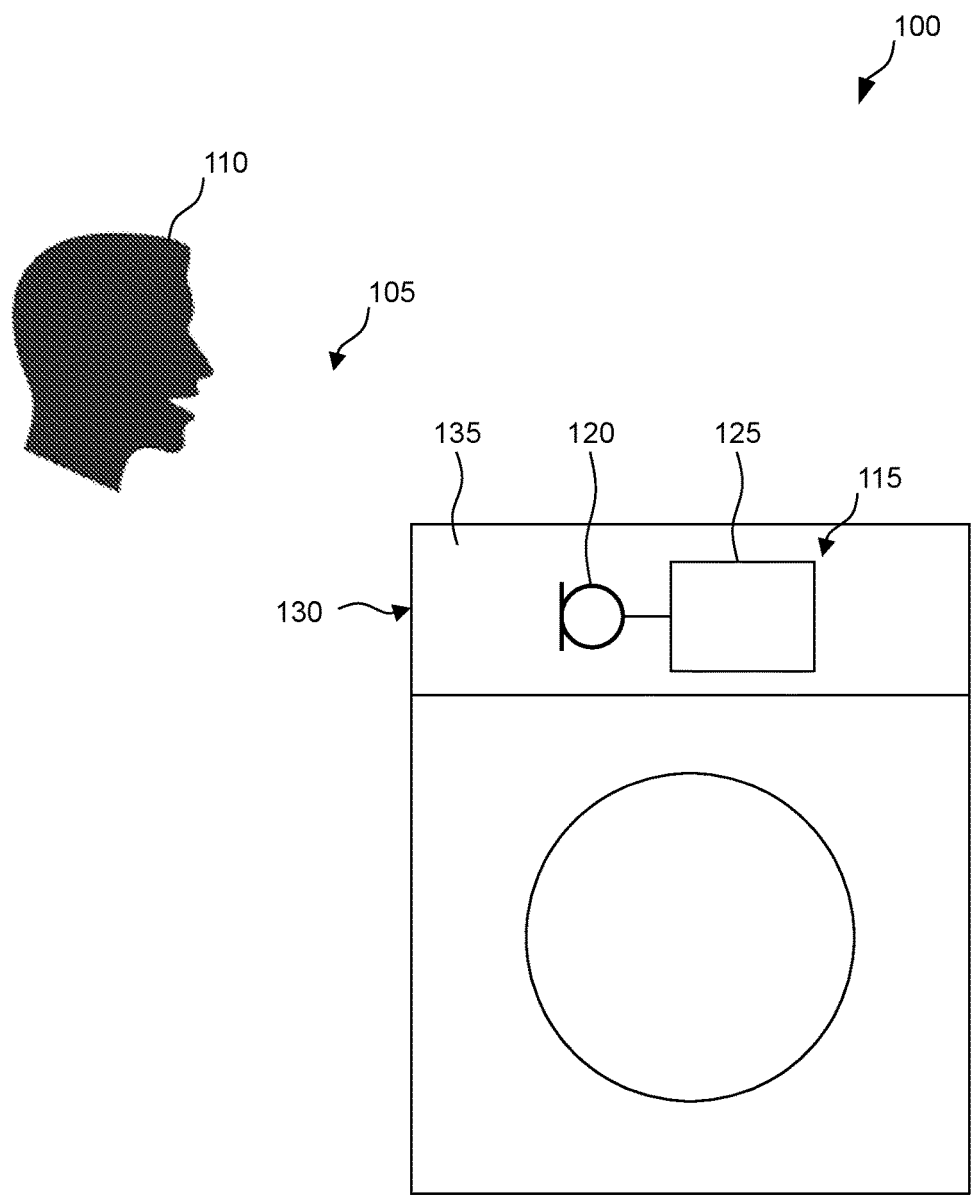
FIG. 1 is an illustration showing an exemplary household device.

Referring now to the figures of the drawings in detail and first, particularly to FIG. 1 thereof, there is shown an exemplary household device 100. The household device 100 may contain any device, preferably electrically operated, that is voice controlled by a user 110 in the device's 100 environment 105. In present example embodiment the household device 100 is embodied as a washing machine that may be adapted to clean garment. The household device 100 may be controlled through a control system 115 that supports speech recognition.

The control system 115 contains a microphone 120 that is adapted to sample sound from the environment 105 and a controller 125 that is adapted to recognize a spoken command in the sound data. The control system 115 may be adapted to control operation of the household device 100. Especially the device 100 may be adapted to perform a primary function such as cleaning garment in the present case, and the controller 125 may be adapted to control one or several elements or units that serve this purpose. Such elements may for instance comprise a water pump, a hydraulic valve or an electric motor.

The household device 100 may be operated in a wet environment or use water for its own operation so that good placement of the microphone 120 is important. On the one hand the microphone should be positioned such that it picks up sound from the environment 105 well. On the other hand the microphone 120 should be kept away from water, especially splash water.

The household device 100 contains a chassis or body element with a front face 130 that is covered by a front cover 135. The front cover 135 may be made for instance out of stainless steel, aluminum or plastic. The cover 135 may be a functional and/or a design element. An exterior view of the front side of the household device 100 may be determined by the front cover 135. There may exist a requirement that a recess in the front cover 135 is to be avoided. The requirement may have a safety, technical or design background.

It is proposed to place the microphone 120 near the front face 130 but preferably behind the front cover and to install the front cover 135 slightly spaced apart from the front face 130 at least in an area where the microphone 120 resides. An air gap that is formed between the front face 130 and the front cover 135 may then be used as an acoustic path or sound path between the environment 105 and the microphone 120.

Figure 2:
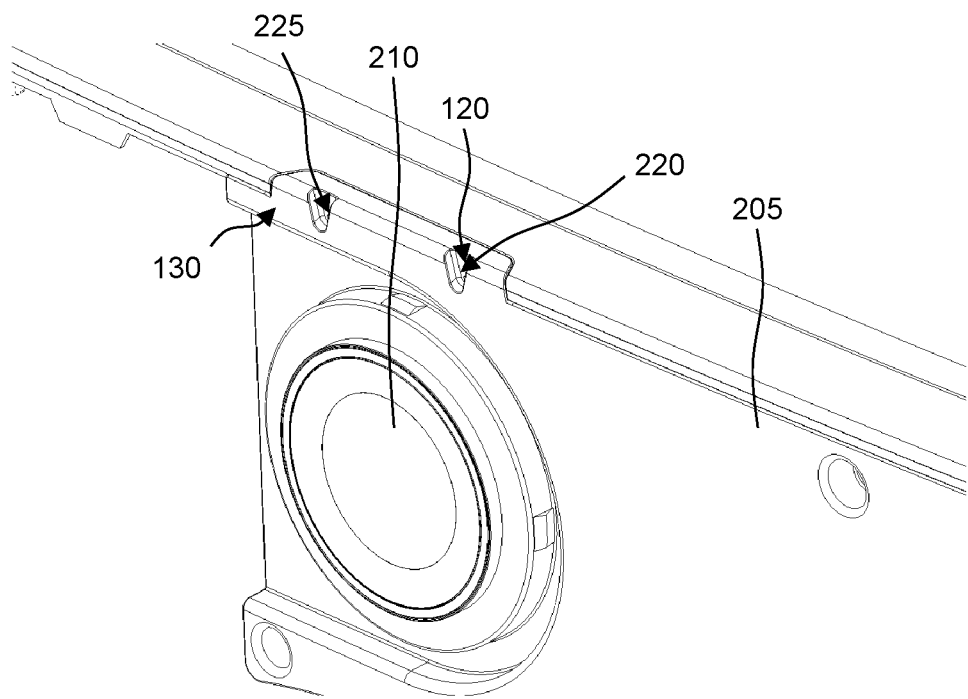
FIGS. 2 and 3 show partial, perspective views of the household device.
Figure 3:
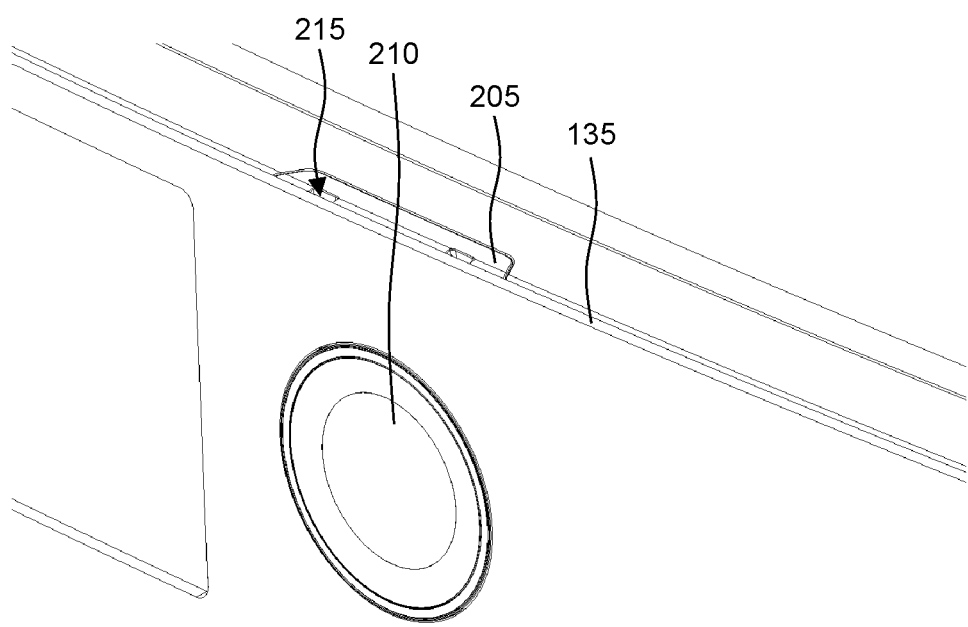
Figure 4:
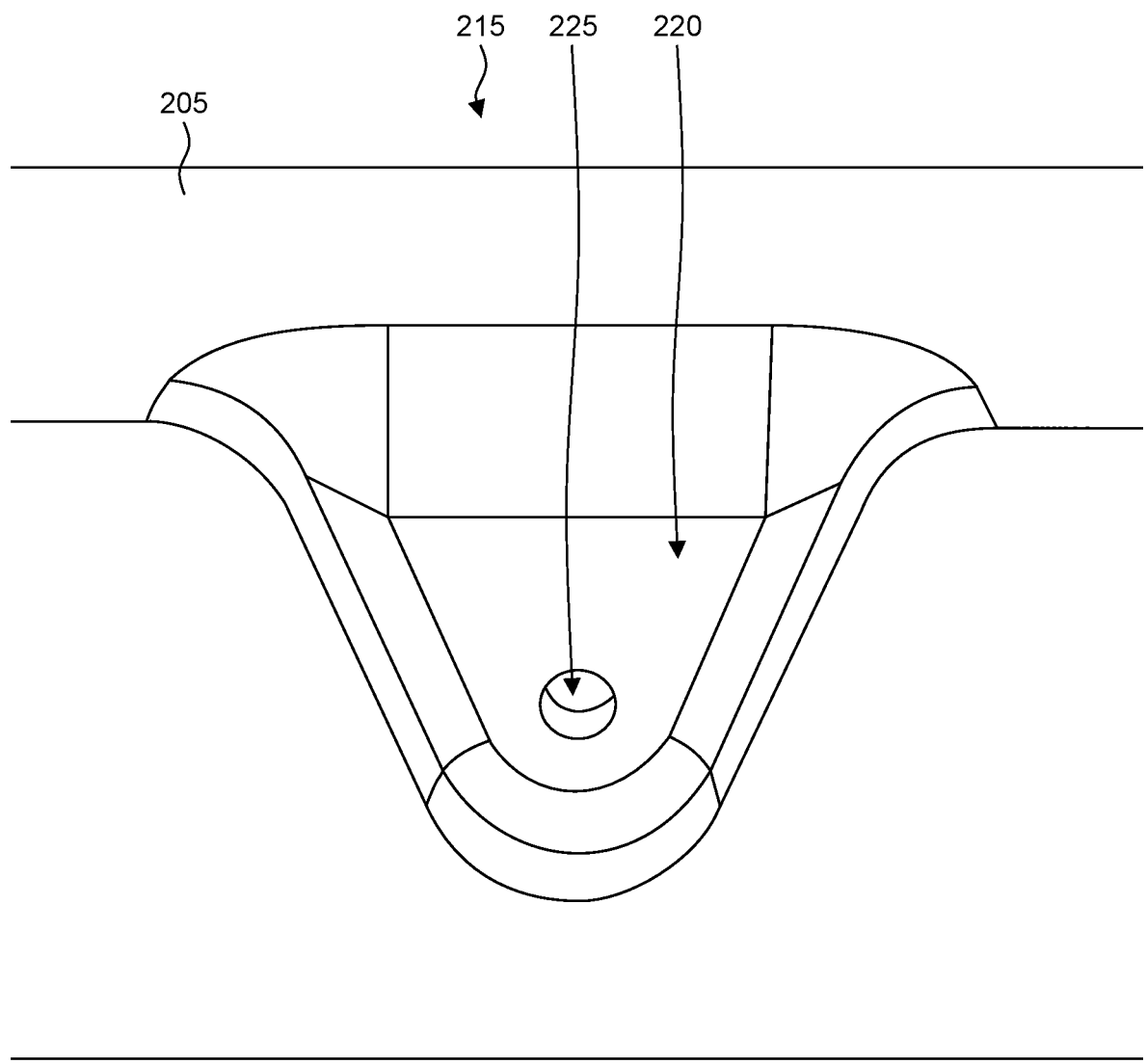
FIG. 4 is a perspective view showing a detail of a front face of the household device.

FIGS. 2 and 3 show partial views of an exemplary household device 100 from an inclined angle. FIG. 2 shows the front face 130 without the front cover 135 and FIG. 3 shows the front face 130 with the front cover 135 installed. In the following, reference will be made to both drawings.

The front face 130 is formed as the frontmost surface of a body element 205. The household device 100 is assumed to be roughly brick shaped and its front side is the one a user will usually look at when operating the device 100. For a washing machine the front side may be the one with the door for loading and unloading garment (cf. FIG. 1). In present embodiment the body element 205 comprises a disc shaped manual control element 210.

Near the top of the front side, one or several microphones 120 (not visible in FIGS. 2 and 3) may be placed. A microphone 120 may be connected to an environment of the household device 100 by an air filled sound path 215 that permits the conductance of sound. The sound path 215 may comprise a vertical section 220 and an optional horizontal section 225 (cf. FIG. 3). The vertical section 220 may be shaped like a wedge or a funnel. Viewed from the front side, the vertical section 220 may appear to have an outline shape similar to the letter V or the letter U.

The vertical section 220 may be shaped by an indentation in the body element 205 and/or in the front cover 135. The vertical section 220 may be laterally limited by a boundary that is shaped in the body element 205 or in the front cover 135, respectively. The vertical section 220 is preferred to open towards the top of the household device 100, where it has its widest cross section. A width of the vertical section 220 at its top may be around 10 mm. Depth of then vertical section 220 may measure about 2-3 mm.

FIG. 3 shows a schematic drawing of the sound path 215 in closeup. The sound path 215 is limited by the body element 205. In present view, the sound path 215 is open on the front side where the front cover 135 may be installed. The horizontal section 225 is formed by a horizontal hole through the body element 205. The hole is preferred to be located a little higher than a lowest end of the vertical section 220, so that water or another substance may accumulate in the vertical section 220 without flowing into the horizontal section 225.

The following is a summary list of reference numerals and the corresponding structure used in the above description of the invention:

100 household device
105 user
110 environment
115 control system
120 microphone
125 controller
130 front face
135 front cover
205 body element 210 control element
215 sound path, acoustic path
220 vertical section
225 horizontal section

The invention claimed is:

1. A household device, comprising:
a microphone adapted to sample sound from a surrounding of the household device;
a processor for recognizing a voice command on a basis of the sound sampled;
a front face extending in a vertical direction; and
a front cover affixed to said front face so that an acoustic path from the surrounding to said microphone includes a gap between said front face and said front cover, wherein the acoustic path between said front face and said front cover gets narrower in a descending direction.

2. The household device according to claim 1, wherein the acoustic path extends in a vertical direction between said front face and said front cover.

3. The household device according to claim 1, wherein the acoustic path between said front face and said front cover is limited in a lateral direction.

4. The household device according to claim 1, wherein the acoustic path between said front face and said front cover has a constant thickness.

5. The household device according to claim 1, wherein the acoustic path has a horizontal section.

6. The household device according to claim 1, wherein said front face has a recess formed therein, said acoustic path extends through said recess in said front face.

7. The household device according claim 6, wherein the acoustic path between said front face and said front cover extends vertically lower than said recess.

8. The household device according to claim 1, wherein said processor is adapted to control the household device in accordance with a recognized voice command.

9. The household device according to claim 1, wherein the household device is adapted to operate in a splash water environment.

10. The household device according to claim 1, further comprising a washing machine or a tumble dryer.

* * * * *